US012670060B2

(12) United States Patent
Nguyen et al.

(10) Patent No.: US 12,670,060 B2
(45) Date of Patent: Jun. 30, 2026

(54) DYNAMICALLY CONFIGURABLE LOW DENSITY PARITY CHECK CODE

(71) Applicant: MICRON TECHNOLOGY, INC., Boise, ID (US)

(72) Inventors: Phong S. Nguyen, Livermore, CA (US); Dung Viet Nguyen, San Jose, CA (US); James Fitzpatrick, Laguna Niguel, CA (US); Sivagnanam Parthasarathy, Carlsbad, CA (US); Zhengang Chen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 18/615,592

(22) Filed: Mar. 25, 2024

(65) Prior Publication Data
US 2024/0330105 A1      Oct. 3, 2024

Related U.S. Application Data

(60) Provisional application No. 63/454,847, filed on Mar. 27, 2023.

(51) Int. Cl.
G06F 11/10 (2006.01)

(52) U.S. Cl.
CPC ...... G06F 11/1004 (2013.01); G06F 11/1068 (2013.01)

(58) Field of Classification Search
None
See application file for complete search history.

(56) References Cited

U.S. PATENT DOCUMENTS

| | | | | | |
|---|---|---|---|---|---|
| 8,341,492 | B2 * | 12/2012 | Shen | ........... | H03M 13/1105 |
| | | | | | 714/758 |
| 9,667,276 | B1 * | 5/2017 | Tunali | ........... | H03M 13/616 |
| 9,813,080 | B1 * | 11/2017 | Micheloni | ........... | H03M 13/112 |
| 10,230,396 | B1 * | 3/2019 | Micheloni | ........... | H03M 13/114 |
| 11,258,536 | B2 * | 2/2022 | Myung | ........... | H03M 13/116 |
| 2010/0077277 | A1 * | 3/2010 | Shen | ........... | H03M 13/6544 |
| | | | | | 714/752 |
| 2010/0088573 | A1 | 4/2010 | Lakkis | | |
| 2010/0115371 | A1 * | 5/2010 | Shen | ........... | H03M 13/635 |
| | | | | | 714/752 |

(Continued)

FOREIGN PATENT DOCUMENTS

KR         100651881 B1      12/2006

OTHER PUBLICATIONS

N. Talati, Z. Wang and S. Kvatinsky, "Rate-compatible and high-throughput architecture designs for encoding LDPC codes," 2017 IEEE International Symposium on Circuits and Systems (ISCAS), Baltimore, MD, USA, 2017, pp. 1-4, (Year: 2017).*

(Continued)

*Primary Examiner* — Daniel F. McMahon
(74) *Attorney, Agent, or Firm* — Lowenstein Sandler LLP

(57) ABSTRACT

Input data is received for storage by a system. The input data is encoded using a low-density parity-check (LDPC) matrix to generate encoded data, wherein the LDPC matrix is selected from a plurality of LDPC matrices, each of the plurality of LDPC matrices having a common size and a unique degree distribution. The encoded data is then stored on a memory device of the system.

16 Claims, 6 Drawing Sheets

(56)         References Cited

U.S. PATENT DOCUMENTS

| | | | |
|---|---|---|---|
| 2013/0283131 A1* | 10/2013 | Tsatsaragkos .... | H03M 13/6505 |
| | | | 714/776 |
| 2015/0121173 A1 | 4/2015 | Yang et al. | |
| 2019/0028117 A1* | 1/2019 | Xiong ............... | H03M 13/6561 |
| 2019/0296768 A1 | 9/2019 | Ma et al. | |
| 2020/0004628 A1 | 1/2020 | Ben-Rubi et al. | |

OTHER PUBLICATIONS

F. Gioulekas, C. Petrou, A. Vgenis and M. Birbas, "On the construction of LDPC convolutional code ensembles based on permuted circulant unit matrices," 2014 21st IEEE International Conference on Electronics, Circuits and Systems (ICECS), Marseille, France, 2014, pp. 407-410, (Year: 2014).*
International Search Report and Written Opinion for International Application No. PCT/US2024/021626, mailed Jul. 19, 2024, 09 pages.

* cited by examiner

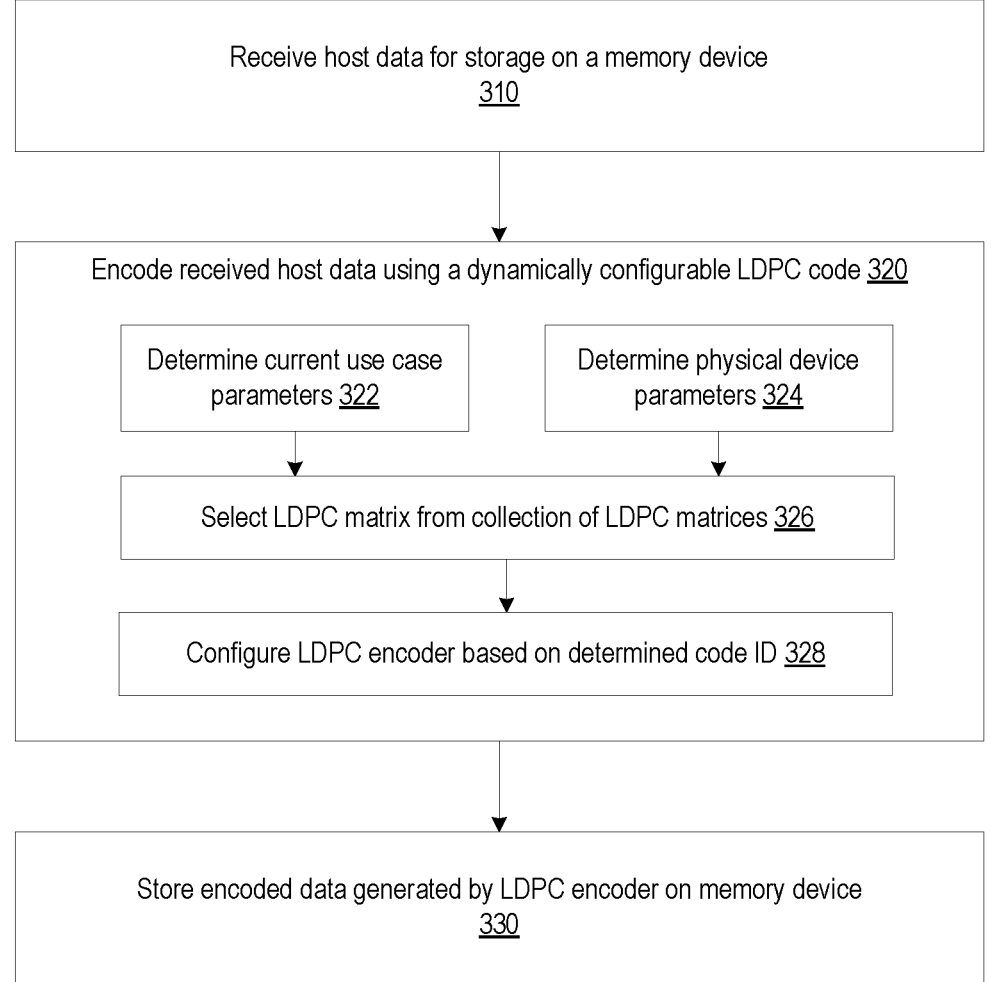

Receive host data for storage on a memory device
310

Encode received host data using a dynamically configurable LDPC code 320

Determine current use case parameters 322

Determine physical device parameters 324

Select LDPC matrix from collection of LDPC matrices 326

Configure LDPC encoder based on determined code ID 328

Store encoded data generated by LDPC encoder on memory device
330

FIG. 3

Retrieve encoded data from memory device as sensed data
410

Decode sensed data using a dynamically configured LDPC code 420

Determine an LDPC code used to encode sensed data 422

Configure LDPC decoder based on determined code ID 424

Return decoded host data produced by LDPC decoder
430

DYNAMICALLY CONFIGURABLE LOW DENSITY PARITY CHECK CODE

RELATED APPLICATIONS

This application claims the benefit of U.S. Provisional Application No. 63/454,847, filed Mar. 27, 2023, the entire contents of which are hereby incorporated by reference herein.

TECHNICAL FIELD

Embodiments of the disclosure relate generally to memory sub-systems, and more specifically, relate to memory sub-systems that employ a dynamically configurable low density parity check (LDPC) code.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a high-level flow diagram of an example method of encoding data using a dynamically configurable LDPC code in accordance with some embodiments of the present disclosure.

DETAILED DESCRIPTION

Figure 1A:
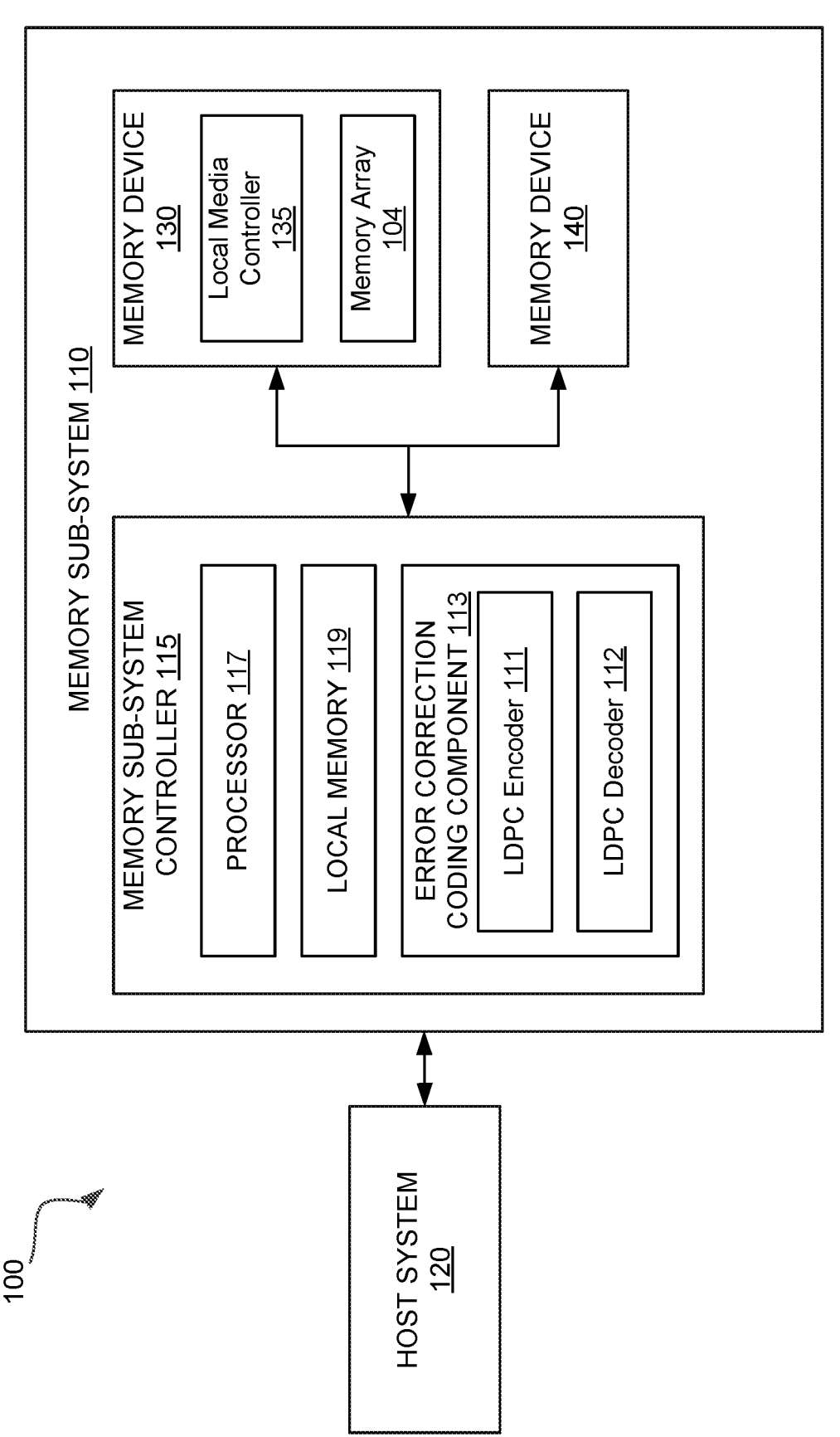
FIG. 1A illustrates an example computing system that includes a memory sub-system in accordance with some embodiments of the present disclosure.

Aspects of the present disclosure are directed to a memory sub-system that employs a dynamically configurable low density parity check (LDPC) code. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND memory devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of cells arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device, for example, can include circuitry that performs concurrent memory page accesses of two or more memory planes. For instance, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (e.g., in stripes). Accordingly, one request to read a segment of data (e.g., corresponding to one or more data addresses), can result in read operations performed on two or more of the memory planes of the memory device.

Data (e.g., provided by a host system) may be encoded prior to being stored at the memory sub-system (e.g., on a memory device thereof) and may be decoded when later retrieved from the memory sub-system. In some embodiments, for example, data may be encoded using an error correcting code (ECC), which may be used to encode data in such a way (e.g., by including additional redundancy information) so as to allow the data to be recovered even in the case of errors that may be introduced during storage and/or retrieval. By way of example, a sequence of symbols (e.g., representing one or more bits of binary information), may be fed into an encoder to generate a codeword therefrom, which may then be stored by the memory sub-system (e.g., by writing the codeword to memory cells of a memory device thereof). The mapping of the encoder may be chosen such that errors (e.g., bit flips that may occur when storing and/or retrieving the codeword) may be detected and corrected when the codeword is later retrieved by the memory sub-system (e.g., by reading the codeword back from the memory cells of a memory device thereof).

One class of ECCs that can be used are linear codes, which may be characterized by a set of linearly independent relationships (or equations). For example, a linear code having codewords of length N, that may carry K information bits or symbols and (N–K) (or M) parity-check bits or symbols, in general, may be characterized by (N–K) linearly independent relationships. The ratio of the number of information bits or symbols K to codeword length N is frequently referred to as the code rate r (or code efficiency) of the linear code. Linear codes may be defined by a parity-check matrix (frequently denoted H), which may describe the linear relationships that elements of a valid codeword must satisfy. Each row of a parity-check matrix, for example, may describe a separate linear relationship that a valid codeword must satisfy (e.g., requiring the weighted sum of specific elements of the codeword to equal zero), with the value in each column indicating a weight that a particular element is given in the relationship. For instance, each row of a parity-check matrix that defines a binary linear code may require the modulo-2 sum of specific bits of a codeword, which may be given a column weight of '1' (and all other bits '0'), to be equal to zero.

Figure 2:
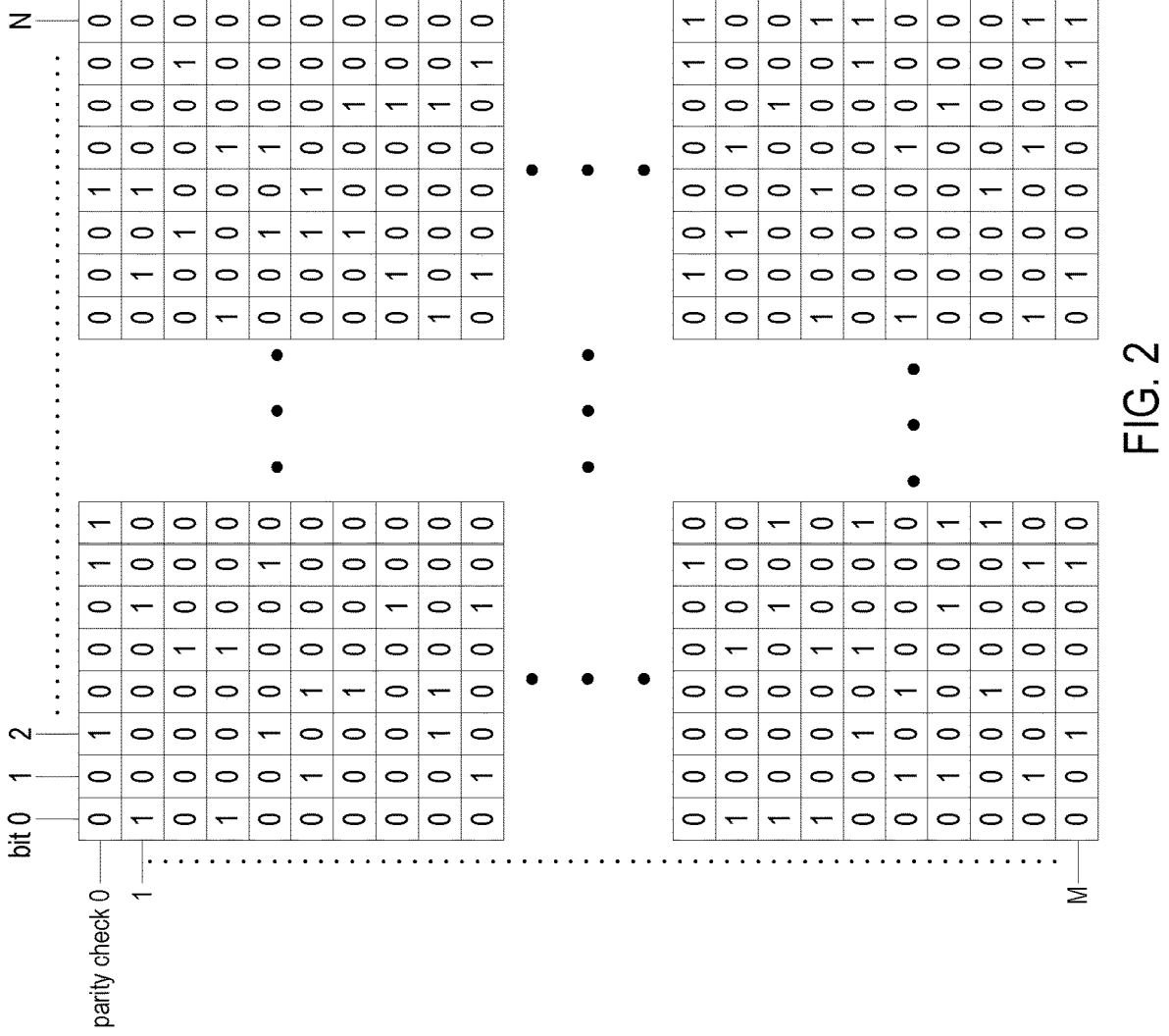
FIG. 2 illustrates an example of a parity-check matrix for an example LDPC code.

Low density parity check (LDPC) codes are a family of linear codes having sparsely populated parity-check matrices (e.g., having a low density of non-zero symbols). A binary LDPC code having codewords of length N, comprising K bits of information and M parity-check bits, may be defined by a parity-check matrix of size M×N. Similarly, a non-binary LDPC code, in which each symbol of the non-binary alphabet represents s bits, may be defined by a parity-check matrix of size sM×sN. As an illustrative example, FIG. 2 depicts an example parity-check matrix 200 of a binary LDPC code. Parity-check matrix 200 has M rows and N columns and defines an LDPC code having codewords of length N that may carry K information bits and M parity bits. Each row of parity-check matrix 200 may describe a linear relationship (or linear constraint) that a valid codeword of the LDPC code must satisfy. By way of example, the first row of parity-check matrix 200 may require a valid codeword to satisfy the relationship: bit-$2 \oplus$bit-$6 \oplus$bit-$7 \oplus$ . . . $\oplus$bit-N-4-=0.

Each column of a parity-check matrix may have a column weight (e.g., indicating the number of 1's in each column), and each row of the parity-check matrix may have a row weight (e.g., indicating the number of 1's in each row). The weight of a column or row may also be referred to as its degree. A regular LDPC code has a parity-check matrix H with uniform column and row weights. An irregular LDPC code, on the other hand, has a parity-check matrix H with non-uniform column and/or row weights (i.e., the number of 1's in each column and/or row is not constant). Irregular LDPC codes may be characterized by column and row degree distributions, which may indicate the number or percentage of columns or rows having a particular weight (or degree). In some embodiments, parity-check matrix 200 may define an irregular LDPC code having uniform column weights but non-uniform row weights. The degree distribution of a parity-check matrix may impact the error correction capability of a corresponding LDPC code (as discussed further below).

Data encoded using an LDPC code may be decoded using a number of different techniques, which may vary in terms of the input they take and the error correction capabilities they provide. Hard-decision decoding techniques, for example, may rely on a "hard" input value of a received codeword (e.g., a singular determination as to whether each bit-value of a codeword is '0' or '1'). A memory sub-system, for example, in retrieving a stored codeword (e.g., from a memory device thereof), may perform a read operation that makes a hard decision as to the value of each bit of the codeword (i.e., as being either '0' or '1') and returns a series of "hard bits." Soft-decision decoding techniques, on the other hand, may consider "soft" input information (alongside a hard input value) that may indicate a reliability of a hard value determination (e.g., a confidence level or likelihood that a particular bit-value is in fact '0' or '1'). A memory sub-system, for example, in retrieving a stored codeword, may perform a read operation that not only returns a hard value as a series of hard bits, but also a series of one or more "soft bits" for each hard bit, which may indicate a reliability of a particular hard bit determination. Illustratively, a read operation may return three soft bits of information for each hard bit, with '000' indicating a highest level of reliability and '111' indicating a lowest level of reliability in the hard bit determination. Soft-decision decoding techniques may be described in terms of the number of hard bits (H) and soft bits(S) that are provided as input (e.g., 1H2S, 1H3S, etc.).

In general, soft-decision decoding techniques may provide for relatively better error correction as compared to hard-decision decoding techniques, but they tend to be more expensive to implement. Soft-decision decoding techniques, for example, may involve more complicated and time-consuming read operations (e.g., to obtain the desired reliability information), utilize higher power and/or more complex decoding circuitry, or present other issues. In at least one embodiment, a memory sub-system may employ multiple decoding techniques in order to achieve better overall performance. A memory sub-system, for example, may attempt to decode a codeword using a first technique (e.g., a hard-decision decoding technique), which may be performed relatively quickly and/or efficiently, and if it fails, a second fallback technique may be triggered (e.g., a soft-decision decoding technique), which may provide for more robust error correction.

A memory sub-system may be designed to satisfy different performance criteria under different usage conditions. In particular, a memory sub-system may be designed to have a particular trigger rate or data reliability under different usage conditions. A trigger rate of a memory sub-system may refer to the rate at which a first decoding technique (e.g., hard-decision decoding) may fail such that a second fallback technique (e.g., a 1H2S soft-decision decoding) may be triggered. A trigger rate of a memory sub-system, for instance, may be specified in terms of a maximum codeword error rate (CWER) when performing LDPC decoding using a hard input under certain usage conditions (e.g., stressed data retention conditions). A trigger rate, for example, may be specified for after a particular number of program/erase cycles (PECs) (e.g., 30 PECs) have been performed and the memory sub-system has been stored at a particular temperature for a particular duration (e.g., one year at 30 degrees Celsius). In general, it is desirable to have a low trigger rate (i.e., a low maximum CWER) because invoking the fallback technique too frequently may be detrimental to performance (e.g., resulting in a slower read time, reduced throughput, etc.).

Data reliability may refer to the rate at which data may be reliably retrieved by the memory sub-system. The reliability of a memory sub-system, for example, may refer to the rate at which data may be successfully recovered therefrom (e.g., after applying one or more decoding techniques). The reliability of a memory sub-system, for instance, may be specified in terms of a maximum codeword error rate (CWER) when performing LDPC decoding using a soft input (e.g., 1H2S or 1H3S) under certain usage condition (e.g., stressed data retention conditions), which may differ from those used to specify a trigger rate. A data reliability, for example, may be specified for after performance of a particular number of PECs and withdrawal of power to the memory sub-system for a particular duration (e.g., without power for two years). In general, it is desirable for data reliability to be high (i.e., a low maximum CWER) because data loss should be minimized.

As noted above, the LDPC code employed by a memory sub-system may affect its error correction capabilities. The degree distribution of an irregular LDPC code, for example, may affect the codeword error rate (CWER) exhibited when decoding using a hard input or soft input. The degree distribution of an irregular LDPC code, therefore, may impact the trigger rate and reliability of a memory sub-system, and in practice, a tension may exist between the two. For example, the degree distribution of an LDPC code that is optimal under certain usage conditions for one character-istic may be sub-optimal with respect to the other and vice versa.

Certain memory sub-systems employ a single LDPC code fixed at a time of manufacture. But the use of a single fixed LDPC code may be sub-optimal (e.g., with respect to trigger rate and reliability under different usage conditions) and may constrain system design and/or result in poor system performance. Memory sub-systems, for example, may be designed to meet certain performance criteria in particular operating conditions. A datacenter or high-performance compute (HPC) application, for instance, may be designed for operation in a narrow temperature range and to meet rigorous performance criteria (e.g., providing fast response times, high throughput, etc.), whereas a consumer electron-ics application (e.g., a cell phone) may be designed for operation in a relatively wider temperature range with more relaxed performance criteria. Accordingly, in some applica-tions, a memory sub-system may be trigger rate limited while in others it may be reliability limited (i.e., where achieving a desired trigger rate or reliability under certain usage conditions may constrain or limit system design and performance). Moreover, the performance criteria of a memory sub-system for a particular application may vary over time. The performance criteria of a memory sub-system at beginning-of-life (BoL) (e.g., when first shipped or put into service), for example, may differ from those at its end-of-life (EoL) (e.g., at the end of a qualified, warranty, or service period) and/or at different points there between. As a result, a memory sub-system may be trigger rate or reliability limited at one point in time (e.g., BoL) and reliability or trigger rate limited at another (e.g., EoL). Furthermore, the performance of a memory sub-system may depend on the physical properties of the memory device(s) used therein (i.e., on which encoded data may be stored and from which encoded data may be retrieved). For example, different dies, planes, blocks, wordlines, or other groups of memory cells may exhibit different performance character-istics. Accordingly, certain dies, planes, blocks, wordlines, or other groups of memory cells may be trigger rate limited while others may be reliability limited.

Aspects of the present disclosure address the above and other deficiencies by providing a memory sub-system that may employ a dynamically configurable LDPC code to encode data for storage on a memory device and decode encoded data retrieved therefrom. In at least one embodi-ment, for example, a memory sub-system may maintain a collection of LDPC matrices that define a number of distinct LDPC codes and may dynamically select a particular LDPC matrix from the collection of LDPC matrices for use in encoding data for storage. In at least one embodiment, for example, each LDPC matrix in the collection of LDPC matrices may be of the same size but may have a unique degree distribution. In some embodiments, for example, the LDPC matrices in the collection may have uniform (or relatively uniform) row weights but varying column weights. As a result, different LDPC matrices, having dif-ferent degree distributions, may be optimal for different usage conditions. In some embodiments, error correction coding component 113 may operate to select an optimal LDPC matrix (e.g., with respect to trigger rate or reliability) from the collection of LDPC matrices for encoding the host data.

In at least one embodiment, for example, the memory sub-system may select an LDPC matrix from the collection of LDPC matrices based on different use case parameters and/or physical device parameters. In at least one embodi-ment, for example, an LDPC matrix may be selected based on a desired code rate, an operating state of the memory device on which the encoded data is to be stored (e.g., number of PECs, write temperature), and/or physical char-acteristics of the memory device, or location therein, where the encoded data is to be stored (e.g., a wordline or block location, a page type, and/or die information). Encoded data may be stored by the memory sub-system in association with the dynamically configured LDPC code (e.g., LDPC matrix) used to encode the data so that the same LDPC code can be used to decode the encoded data when later retrieved. By dynamically selecting an LDPC matrix from a collection of LDPC matrices, the memory sub-system may be able to employ an LDPC code that is optimal, for example, with respect to trigger rate or reliability for specific usage con-ditions. The LDPC code employed by the memory sub-system, for example, may be adapted to a particular appli-cation and specific usage conditions, may evolve over time (e.g., over a lifetime of the memory sub-system and/or a memory device thereof), and/or may account for physical characteristics of an underlying memory device. As a result, greater freedom may be provided during system design and/or a system performance may be significantly improved.

Figure 1B:
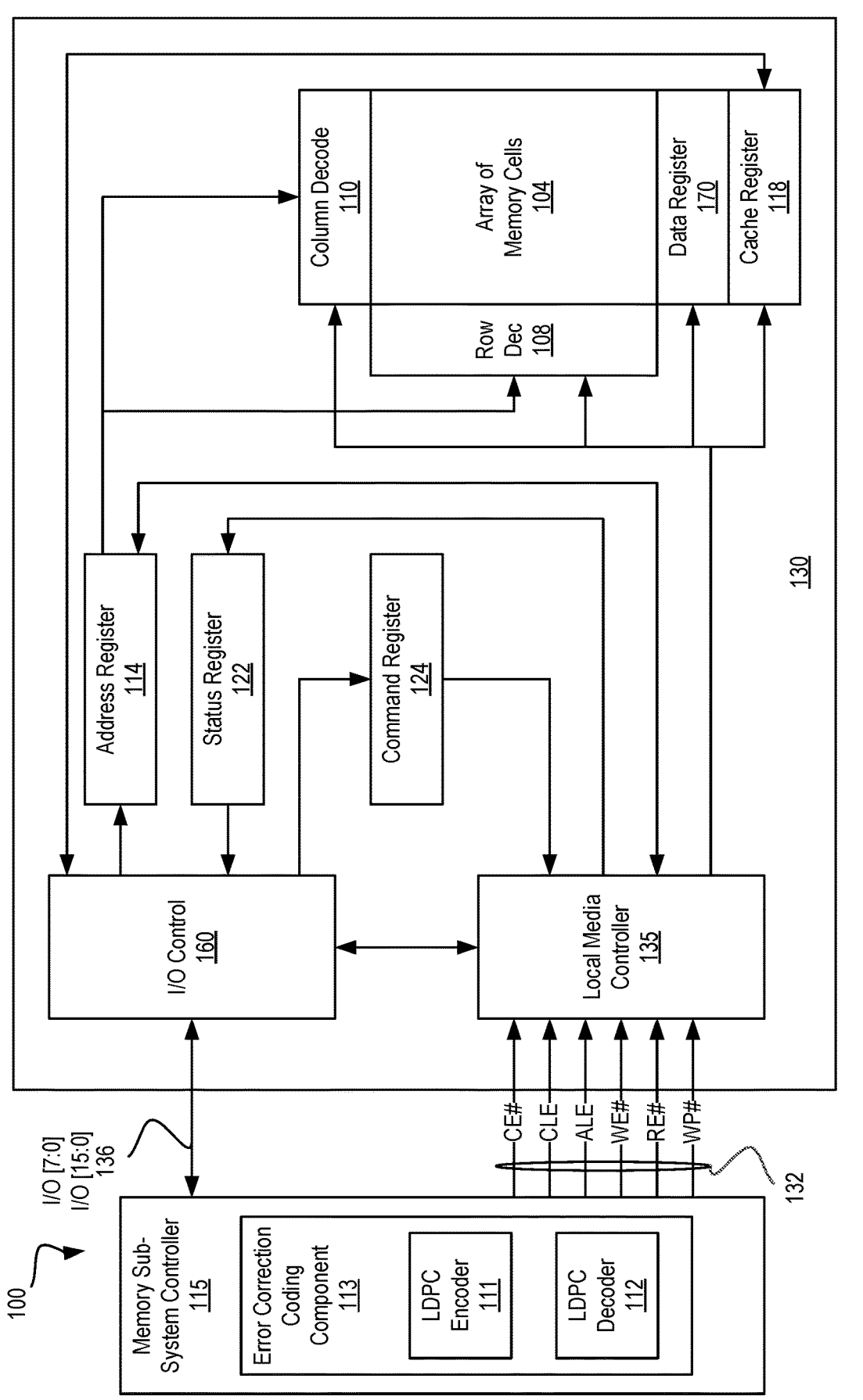
FIG. 1B illustrates a block diagram of a memory device in communication with a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In at least one embodiment, memory sub-system 110 may include an error correction coding component 113 that may employ a dynamically configurable LDPC code to encode host data for storage on a memory device and decode encoded data retrieved therefrom. In at least one embodiment, for example, error correction coding component 113 may maintain a collection of LDPC matrices that define a number of distinct LDPC codes and may dynamically select a particular LDPC matrix from the collection of LDPC matrices for encoding the host data. In at least one embodiment, for example, each LDPC matrix in the collection of LDPC matrices may be of the same size but may have a unique degree distribution. In some embodiments, for example, the LDPC matrices in the collection may have varying row and/or column weights. In some embodiments, the LDPC matrices in the collection may have uniform (or relatively uniform) row weights but varying column weights. As a result, different LDPC matrices (having different degree distributions) may be optimal for different usage conditions, and error correction coding component 113 may select an optimal LDPC matrix (e.g., with respect to trigger rate or reliability) from the collection of LDPC matrices for encoding the host data.

In at least one embodiment, error correction coding component 113 may select an LDPC matrix from the collection of LDPC matrices based on the particular conditions in which the LDPC code will be used. In at least one embodiment, for example, error correction coding component 113 may select an LDPC matrix from the collection of LDPC matrices based on different use case parameters and/or physical device parameters. In at least one embodiment, for example, error correction coding component 113 may select an LDPC matrix based on a desired code rate, an operating state of the memory device on which the encoded data is to be stored (e.g., number of PECs, write temperature), and/or physical characteristics of the memory device, or a location therein, where the encoded data is to be stored (e.g., a wordline or block location, a page type, and/or die information). In at least one embodiment, memory sub-system 110 may store encoded data in association with the LDPC code (e.g., LDPC matrix) used to generate the encoded data so that the same LDPC code can be used (e.g., by an LDPC decoder 112 of error correction coding component 113) to decode encoded data when later retrieved from a memory device. In at least one embodiment, for example, such information may be stored as part of an FTL mapping table maintained by memory sub-system 110. By dynamically configuring the LDPC code used to encode and decode data, the LDPC code that is employed by error correction coding component 113 may be relatively optimal (e.g., with respect to trigger rate or reliability) for the specific conditions in which it may be used. That is, the LDPC code employed by the memory sub-system may be adapted for a particular application and specific usage conditions, may evolve over time (e.g., over a lifetime of the memory sub-system and/or a memory device thereof), and/or may account for physical characteristics of an underlying memory device. As a result, greater freedom may be provided during system design and/or a system performance may be significantly improved. Further details with regards to the function and operation of the error correction coding component 113 is provided below.

As noted above, memory sub-system 110 may include an error correction coding component 113 that may be used to encode data for storage on a memory device and decode encoded data when retrieved from a memory device. For example, in at least one embodiment, memory sub-system 110 (e.g., memory sub-system control 115) may receive data from host system 120 (or host data) along with a request to store the host data. The host data received from host system 120 may be or include a stream of one or more data symbols (e.g., representing one or more bits of binary information). In some cases, for example, the host data may be or include a stream of binary data bits (e.g., a stream of 0's and 1's). Memory sub-system 110 (e.g., memory sub-system controller 115) may provide the host data to error correction coding component 113 and instruct error correction coding component 113 to generate encoded host data (or encoded data) therefrom.

In at least one embodiment, for example, error correction coding component 113 may use an error correcting code (ECC), such as a low-density parity-check (LDPC) code, to encode data in such a way (e.g., by including redundant information) so as to allow errors, which may be introduced (e.g., during storage and/or retrieval of the encoded data to/from a memory device), to be detected and corrected when later decoded. In at least one embodiment, for example, error correction coding component 113 may include an LDPC encoder 111 that error correction coding component 113 may use to encode host data using an LDPC code. In at least one embodiment, error correction coding component 113 may process host data using an LDPC code and generate one or more codewords therefrom. Error correction coding component 113, for instance, may use the LDPC encoder 111 to process a sequence of one or more symbols of host data and generate a codeword therefrom. Error correction coding component 113, for example, may use the LDPC encoder 111 to process K bits of host data to generate codewords of length N therefrom, which may contain K bits of host data and N–K (or M) bits of redundancy data (or parity-check bits).

In at least one embodiment, error correction coding component 113 may provide LDPC encoder 111 with host data (e.g., a host data sequence) and instruct the LDPC encoder 111 to encode the data using an LDPC code. In at least one embodiment, for example, LDPC encoder 111 may use a parity-check matrix that defines an LDPC code (or an LDPC matrix) to encode host data (e.g., a host data sequence). By way of example, with reference to FIG. 2, a binary LDPC code may be defined by a parity-check matrix H of size M×N. The LDPC encoder 111 may use parity-check matrix H to process K bits (or N-M bits) of host data to generate a codeword C of length N. In at least one embodiment, for example, the LDPC encoder 111 may derive a generator matrix G from the parity-check matrix H, which the LDPC encoder 111 may use to generate codeword C. The LDPC encoder 111, for instance, may multiply the K-bit host data sequence by generator matrix G to generate codeword C. In at least one embodiment, a size of parity matrix H and/or value of K may be chosen so that the resulting codeword C is a particular size. The size of parity matrix H and/or value of K, for example, may be selected such that the codeword C generated therefrom is the same size as a page or block (or other grouping) of memory cells, which may facilitate storage of the encoded data on a memory device.

In at least one embodiment, error correction coding component 113 may dynamically configure the LDPC code used by LDPC encoder 111 to encode host data (e.g., to encode a host data sequence). In at least one embodiment, for example, error correction coding component 113 may maintain a collection of LDPC matrices that define a number of distinct LDPC codes and may dynamically select a particular LDPC matrix from the collection of LDPC matrices for use by LDPC encoder 111 in encoding host data (e.g., selecting an LDPC matrix for encoding a particular host data sequence). In at least one embodiment, each LDPC matrix in the collection of LDPC matrices may be of the same size but may have a unique degree distribution. In some embodiments, for example, the LDPC matrices in the collection may have varying row and/or column weights. In some embodiments, the LDPC matrices in the collection may have uniform (or relatively uniform) row weights but varying column weights. As a result, different LDPC matrices (having different degree distributions) may be optimal for different usage conditions. In at least one embodiment, error correction coding component 113 may select an optimal LDPC matrix (e.g., with respect to trigger rate or reliability) from the collection of LDPC matrices for use by LDPC encoder 111. In at least one embodiment, error correction coding component 113 may select an LDPC matrix from the collection of LDPC matrices based on the particular conditions in which the LDPC code will be used.

In at least one embodiment, for example, error correction coding component 113 may select an LDPC matrix from a collection of LDPC matrices based on one or more use case parameters and/or physical device parameters. In some embodiments, error correction coding component 113 may access or retrieve the use case parameters and/or physical device parameters from memory (e.g., from local memory 119), where such information may be stored and/or updated (e.g., in a device configuration file, different status registers, etc.).

In at least one embodiment, for example, error correction coding component 113 may select an LDPC matrix based (at least in part) on a desired code rate of the LDPC code, an operating state of the memory device on which the encoded data is to be stored, and/or other use case parameters. For instance, in some embodiments, error correction coding component 113 may select an LDPC matrix based (at least in part) on a current number of program-erase (PE) cycles that the memory device and/or a group of memory cells thereof (e.g., a page or block of memory cells) may have undergone, a current operating temperature of the memory device at which the encoded data is to be written, and/or other operating state parameters. By selecting an LDPC matrix based on one or more use case parameters, the LDPC code used by LDPC encoder 111 may be adapted to a particular application and specific usage conditions and/or may evolve over time.

In at least one embodiment, error correction coding component 113 may select an LDPC matrix from a collection of LDPC matrices based (at least in part) on one or more parameters regarding the physical characteristics of the memory device (e.g., memory device 130) on which the encoded data may be stored. In at least one embodiment, for example, error correction coding component 113 may identify a location on the memory device where the encoded data is to be stored (e.g., where a particular codeword is to be stored) and may select an LDPC matrix based (at least in part) on one or more parameters regarding the physical properties of the identified storage location. For instance, in some embodiments, error correction coding component 113 may select an LDPC matrix based (at least in part) on parameters regarding the wordline, block, page, and/or die where the encoded data is to be stored. For example, because performance may be impacted by the physical location of a wordline (e.g., a vertical position of the wordline within a memory array) or block (e.g., a position of the block in a memory array relative to a driving circuit) within a memory device, the error correction coding component 113 may select an LDPC matrix based (at least in part) on a wordline identifier or block identifier associated with the identified storage location, which may indicate a physical location of the wordline or block within the memory device. Likewise, because performance of a particular die may vary (e.g., on account of manufacturing variations), error correction coding component 113 may select an LDPC matrix based (at least in part) on a lot number, wafer number, and/or intra-wafer die location of the die associated with the identified storage location. Similarly, because performance may be impacted by a page type (e.g., lower, middle, or upper level in a TLC cell), error correction coding component 113 may select an LDPC matrix based (at least in part) on a page type associated with the identified storage location. By selecting an LDPC matrix based on one or more physical device parameters, the LDPC code used by LDPC encoder 111 may be able to account for physical characteristics of an underlying memory device where the encoded is to be stored.

In some embodiments, the collection of LDPC matrices maintained by error correction coding component 113 may be adapted to a particular application or set of applications (e.g., to the expected usage conditions and desired performance criteria of each application). For example, in some embodiments, the collection of LDPC matrices may be adapted for use in a datacenter or high-performance compute (HPC) application, while in others, they may be adapted for use in a consumer electronic application. In some embodiments, the collection of LDPC matrices maintained by error correction coding component 113 may include different sets of LDPC matrices each of which may be adapted to a particular application and specific usage conditions and/or to different stages in a lifetime of memory sub-system 110 or a memory device thereof (e.g., memory device 130). This may allow the LDPC code to be configured based on the application in which memory sub-system 110 may ultimately be used, something which may not be known when the collection of LDPC matrices is stored on memory sub-system 110 (e.g., when it is first manufactured or shipped), and/or to evolve over time.

In at least one embodiment, error correction coding component 113 may configure LDPC encoder 111 to use a selected LDPC matrix for encoding host data (e.g., for encoding a particular host data sequence). For example, in at least one embodiment, the collection of LDPC matrices maintained by error correction coding component 113 may be stored in local memory 119 (e.g., in registers thereof). In some embodiments, the collection of LDPC matrices may be stored in memory device 130, for example, in a secure portion or region thereof (e.g., in SLC memory cells thereof), and may be retrieved and placed in local memory 119 during operation. In at least one embodiment, each LDPC matrix in the collection of LDPC matrices may be associated with a unique code ID. In some embodiments, for example, error correction coding component 113 may maintain a mapping between each LDPC matrix, or memory address associated therewith, and an associated code ID. In at least one embodiment, for instance, error correction coding component 113 may maintain such a mapping using a flat-file database, hash table, or other suitable data structure. In at least one embodiment, the mapping of code IDs to LDPC matrices maintained by error correction coding component 113 may be stored in local memory 119 (e.g., in registers thereof). In some embodiments, the mapping of code IDs to LDPC matrices may be stored in memory device 130, for example, in a secure portion or region thereof (e.g., in SLC memory cells thereof), and may be retrieved and placed in local memory 119 during operation.

In some embodiments, error correction coding component 113 may select an LDPC matrix from the collection of LDPC matrices by selecting a corresponding code ID, which may be provided to LDPC encoder 111 (e.g., as part of an encoding instruction). In some embodiments, for example, error correction coding component 113 may determine a code ID for an LDPC matrix based on one or more use case parameters and/or physical device parameters, as discussed above. In at least one embodiment, for instance, error correction coding component 113 may maintain a mapping between such parameters (e.g., between specific values or ranges of values, which may be identified in terms of an upper and/or lower range boundary) and a code ID. In at least one embodiment, for example, error correction coding component 113 may maintain a flat-file database, a hash table, or other suitable data structure. In at least one embodiment, the mapping of parameters to code IDs maintained by error correction coding component 113 may be stored in local memory 119 (e.g., in registers thereof). In some embodiments, the mapping may be stored in memory device 130, for example, in a secure portion or region thereof (e.g., in SLC memory cells thereof), and may be retrieved and placed in local memory 119 during operation. Based on the code ID provided by error correction coding component 113, LDPC encoder 111 may retrieve or access a corresponding LDPC matrix (e.g., from local memory 119). In this way, error correction coding component 113 may dynamically configure the LDPC code used by LDPC encoder 111.

In some embodiments, error correction coding component 113 may configure the LDPC code used by LDPC encoder 111 for each host data storage request that is processed. In some embodiments, error correction coding component 113 may configure the LDPC code used by LDPC encoder 111 for each host data sequence in a host data request. In some embodiments, error correction coding component 113 may configure the LDPC code used by LDPC encoder 111 periodically. For example, in some embodiments, error correction coding component 113 may select and/or update the LDPC code used by LDPC encoder 111 at specified intervals of time. In some embodiments, error correction coding component 113 may select and/or update the LDPC code used by LDPC encoder 111 as a location associated with a data cursor changes (e.g., as a write cursor advances to a next block, plane, etc.).

The encoded data generated by error correction coding component 113 may be returned to memory sub-system 110 (e.g., to memory sub-system controller 115), which may store the encoded data on a memory device thereof (e.g., to memory device 130). In at least one embodiment, for instance, memory sub-system 110 may perform a write operation to write the encoded data (e.g., to write a generated codeword) to a memory device (e.g., at an identified storage location therein). In some embodiments, encoded data may be returned to memory sub-system 110 and written to a memory device as the encoded data is generated (e.g., as each encoded codeword is generated). In some embodiments, the encoded data may be returned to and/or written by memory sub-system 110 after all host data in a host data storage request has been encoded.

In at least one embodiment, memory sub-system 110 may also store or record the LDPC code or LDPC codes used to generate encoded data in association with the stored encoded data. In some embodiments, for instance, memory sub-system 110 may record the LDPC matrices used to generate encoded data in association with a location at which the encoded data is written to a memory device. In at least one embodiment, for example, memory sub-system 110 may record a code ID associated with each LDPC matrix used to generate the encoded data being stored. In some embodiments, for instance, memory sub-system 110 may record such information as part of an FTL mapping table maintained by memory sub-system 110 (e.g., maintained by memory sub-system controller 115). The FTL mapping table maintained by memory sub-system 110, for example, may include entries that map a translation unit (TU) to a unique physical location (e.g., physical address) on a memory device (e.g., to a unique location in a memory array of memory device 130). A TU may be the smallest unit of memory managed by the FTL mapping table and may be associated with one or more logical addresses (e.g., one or more logic block addresses (LBAs)). The FTL mapping table (e.g., as part of each entry therein) may store metadata associated with each TU, including for example, one or more physical location identifiers (e.g., a die or LUN number, a physical block number (PBN), etc.) and/or offset information (e.g., a block offset). In some embodiments, memory sub-system 110 may also store an identification of the LDPC code used to encode the data stored at each TU (e.g., a code ID identifying a corresponding LDPC matrix that defines the LDPC code), as part of the metadata maintained for each TU in the FTL mapping table.

As noted above, error correction coding component 113 may also be used to decode encoded data when retrieved from a memory device. For example, in at least one embodiment, memory sub-system 110 (e.g., memory sub-system controller 115) may receive a request from host system 120 to retrieve host data that was previously encoded and stored at memory sub-system 110 (e.g., in response to an earlier storage request). In response to the request, memory sub-system 110 may determine where encoded data corresponding to the requested host data is stored (e.g., using an FTL mapping table maintained by memory sub-system 110) and may perform a read operation to read the encoded data back from a memory device. In at least one embodiment, for example, memory sub-system 110 may read encoded data back from memory device 130 as part of a read operation by performing one or more sense operations to determine a value of the memory cells that store the encoded data. The encoded data read back from the memory device (or sensed data) may comprise one or more sensed codewords.

Memory sub-system 110 may be able to perform different types of read operations, which may return different forms of sensed data. In some embodiments, for example, memory sub-system 110 may perform a read operation that makes a hard decision as to the value of each bit of the encoded data (i.e., as being either '0' or '1') and returns a series of "hard bits." In some embodiments, memory sub-system 110 may perform a read operation that not only returns a hard value as a series of hard bits, but also a series of one or more "soft bits" for each hard bit, which may indicate a reliability of a particular hard bit determination. By way of example, memory sub-system 110 may perform a read operation that returns three soft bits of information for each hard bit, with '000' indicating a highest level of reliability and '111' indicating a lowest level of reliability in the hard bit determination.

Memory sub-system 110 may provide the sensed data returned by a read operation to error correction coding component 113 and instruct error correction coding component 113 to decode the sensed data and obtain the host data encoded therein. It will be appreciated that, in some cases, the sensed data read back from the memory device may differ from the initial encoded data that was first generated, for example, on account of errors (e.g., bit-flip errors) that may have occurred during storage and/or retrieval of the encoded data to/from the memory device. The sensed data, however, may be encoded using an ECC, such as an LDPC code, which may allow error correction coding component 113 to detect and correct errors in the sensed data and obtain initial host data encoded therein. In at least one embodiment, for example, error correction coding component 113 may include an LDPC decoder 112 that error correction coding component 113 may use to decode sensed data encoded using an LDPC code. In at least one embodiment, for instance, error correction coding component 113 may use LDPC decoder 112 to process sensed data and obtain one or more sequences of host data encoded therein. In processing the sensed data, LDPC decoder 112 may detect and attempt to correct any errors therein.

In at least one embodiment, error correction coding component 113 may provide LDPC decoder 112 with sensed data (e.g., a sensed codeword) and instruct the LDPC decoder 112 to attempt to decode the sensed data using an LDPC code. In at least one embodiment, LDPC decoder 112 may use an LDPC matrix that defines an LDPC code to attempt to decode sensed data (e.g., to decode each sensed codeword). In at least one embodiment, the sensed data (e.g., a sensed codeword) may have been encoded using a dynamically configured LDPC code. In such embodiments, error correction coding component 113 may determine the LDPC code used to encode the sensed data and configure LDPC decoder 112 to use that LDPC code for decoding the sensed data.

In some embodiments, for example, the sensed data may have been encoded using an LDPC matrix that was dynamically selected from a collection of LDPC matrices maintained by error correction coding component 113 (as discussed above). In some embodiments, the identity of the LDPC matrix (e.g., a unique code ID associated with the LDPC matrix) may have been recorded in association with the stored encoded data (e.g., in association with a location at which the encoded code is written to a memory device). In some embodiments, for instance, the identity of the LDPC matrix (e.g., an associated code ID) may have been recorded in an FTL mapping table. In some embodiments, for example, the metadata associated with each TU in the mapping table may contain a code ID of the LDPC matrix used to encode the data stored at a location associated with the TU.

In some embodiments, error correction coding component 113 may determine the LDPC matrices (e.g., LDPC code IDs) used to encode the sensed data from the FTL mapping table (e.g., by accessing the metadata of one or more corresponding TUs). In some embodiments, memory sub-system 110 may (e.g., memory sub-system controller 115) may determine the code IDs corresponding to the sensed data (e.g., as part of the read operation) and may provide them to error correction coding component 113 for decoding the sensed data (e.g., as part of a decoding instruction). Error correction coding component 113, in turn, may provide a code ID to LDPC decoder 112 for decoding sensed data. Based on the code ID provided by error correction coding component 113, LDPC decoder 112 may retrieve or access a corresponding LDPC matrix from the collection of LDPC matrices maintained by error correction coding component 113 (e.g., from local memory 119). In this way, error correction coding component 113 may dynamically configure the LDPC code used by LDPC decoder 112.

In some embodiments, LDPC decoder 112 may be able to perform one or more decoding techniques, which may vary in terms of the input they take and the error correction capabilities they provide. In some embodiments, for example, LDPC decoder 112 may be able to perform one or more hard-decision and/or soft-decision decoding techniques. In some embodiments, for example, LDPC decoder 112 may be able to perform a hard-decision decoding technique using a hard input, for example, where a read operation returns a hard-decision as to the value of a codeword (e.g., returning an N-bit codeword). In some embodiments, LDPC decoder 112 may be able to perform a soft-decision decoding technique using a soft input, for example, where a read operation returns a hard-decision as to the value of a codeword (e.g., returning an N-bit codeword) along with reliability information regarding the value of the codeword (e.g., S soft bits of reliability information for each bit of the N-bit codeword).

In some embodiments, memory sub-system 110 may employ multiple decoding techniques in order to achieve better overall performance. In some embodiments, for instance, memory sub-system 110 may attempt to decode a codeword using a first technique (e.g., a hard-decision decoding technique), which may be performed relatively quickly and/or efficiently, and if it fails, a second fallback technique may be triggered (e.g., a soft-decision decoding technique), which may provide for more robust error correction. By way of example, in some embodiments, memory sub-system 110 may perform a first read operation that may return sensed data in the form of hard codeword values, which may be provided to error correction coding component 113 for decoding. Error correction coding component 113 may use LDPC decoder 112 to attempt to decode each codeword in the sensed data using a hard-decision decoding technique to obtain host data sequences therefrom (e.g., to obtain a host data sequence for each codeword in the sensed data). If LDPC decoder 112 is unable to successfully decode a sensed codeword (e.g., if LDPC decoder 112 is unable to correct all errors in the sensed codeword), an error handling procedure may be invoked that may employ a more robust error correction decoding technique. In some embodiments, for example, the first read operation may be paused or aborted, and a second read operation may be performed (e.g., to retrieve the codeword that was not successfully decoded) that may return sensed data in the form of a hard codeword value as well as associated reliability information, which may be provided to error correction coding component 113 for decoding. Error correction coding component 113 may use LDPC decoder 112 to attempt to decode the codeword using a soft-decision decoding technique. If successfully decoded, the initial read operation may be resumed, for example, by performing a first read operation to obtain and process any remaining requested host data using a hard-decision decoding technique (in the case of an aborted initial read operation) or resume processing of any remaining sensed data using a hard-decision decoding technique (in the case of a paused initial read operation).

FIG. 3 is a high-level flow diagram of an example method 300 of encoding data using a dynamically configured LDPC code, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory sub-system 110 using error correction coding component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic may receive host data for storage on a memory device. In at least one embodiment, for example, the processing logic may receive host data from a host system (e.g., host system 120) along with a request to store the host data. The received data may be or include a stream of one or more data symbols (e.g., representing one or more bits of binary information). In some cases, for example, the received may be a binary data stream (i.e., of 0's and 1's).

At operation 320, the processing logic may encode the received host data using a dynamically configured LDPC code and generate encoded data therefrom (e.g., one or more codewords therefrom). In at least one embodiment, for example, the processing logic may provide an LDPC encoder with a sequence of one or more symbols of data and instruct the LDPC encoder to generate an encoded codeword therefrom. In at least one embodiment, for example, the processing logic may use the LDPC encoder to process K bits of host data at a time to generate codewords of length N therefrom, which may contain K bits of host data and N–K (or M) bits of redundancy data (or parity-check bits). In at least one embodiment, for example, the LDPC encoder may use a parity-check matrix that defines an LDPC code to process a sequence of host data. By way of example, with reference to FIG. 2, a binary LDPC code may be defined by a parity-check matrix H of size M×N, which the LDPC encoder may use to process K bits (or N-M bits) of host data to generate a codeword C of length N. In at least one embodiment, a size of parity matrix H and/or value of K may be chosen so that the resulting codeword C is a particular size. The size of parity matrix H and/or value of K, for example, may be selected such that the codeword C generated therefrom is the same size as a page or block (or other grouping) of memory cells, which may facilitate storage of the encoded data on a memory device.

In at least one embodiment, the processing logic may dynamically configure the LDPC code used by the LDPC encoder to encode host data (e.g., to encode a host data sequence). In at least one embodiment, for example, the processing logic may dynamically select an LDPC matrix from a collection of LDPC matrices that define a number of distinct LDPC codes for use by the LDPC encoder. In at least one embodiment, each LDPC matrix in the collection of LDPC matrices may be of the same size but may have a unique degree distribution. In some embodiments, for example, the LDPC matrices in the collection may have varying row and/or column weights. In some embodiments, the LDPC matrices in the collection may have uniform (or relatively uniform) row weights but varying column weights. As a result, different LDPC matrices (having different degree distributions) may be optimal for different usage conditions. In some embodiments, the processing logic may select an optimal LDPC matrix (e.g., with respect to trigger rate or reliability) from the collection of LDPC matrices for use by the LDPC encoder. In at least one embodiment, for example, the processing logic may select an LDPC matrix based on the particular conditions in which the LDPC code will be used. In at least one embodiment, for instance, the processing logic may select an LDPC matrix based on one or more use case parameters and/or physical device parameters. In at least one embodiment, for example, the collection of LDPC matrices may be stored in a memory (e.g., local memory 119), with each LDPC matrix in the collection being associated with a unique code ID, and the processing logic may select an LDPC matrix based on its code ID.

By way of example, in some embodiments, at operation 322, the processing logic may determine one or more use case parameters, including for example, a desired code rate of the LDPC code and different operating state parameters regarding the memory device on which the encoded data is to be stored. In at least one embodiment, for example, the processing logic may determine a current number of program-erase (PE) cycles that the memory device and/or a group of memory cells thereof (e.g., a page or block of memory cells) have undergone, a current operating temperature of the memory device, or other operating state parameters. In some embodiments, the processing logic may access or retrieve the use case parameters from memory (e.g., from local memory 119), where such information may be stored and/or updated (e.g., in a device configuration file, different status registers, etc.).

At operation 324, the processing logic may determine one or more physical device parameters regarding the physical characteristics of the memory device (e.g., memory device 130) on which the encoded data is to be stored. In some embodiments, for example, the processing logic may identify a location on the memory device where the encoded data is to be stored (e.g., where a particular codeword is to be stored) and may determine one or more parameters regarding the physical properties of the identified storage location. In some embodiments, for instance, the processing logic may determine a wordline identifier (e.g., wordline number), block identifier (e.g., block number), page type, and/or die information (e.g., lot number, wafer number, and/or intra-wafer die location). In some embodiments, the processing logic may access or retrieve the physical device parameters from memory (e.g., from local memory 119), where such information may be stored (e.g., in a device configuration file).

At operation 326, the processing logic may select an LDPC matrix from the collection of matrices by selecting a corresponding code ID based on the use case parameters and/or physical device parameters determined at operations 322 and 324. In some embodiments, for example, the processing logic may determine the code ID based on a mapping between the parameters (e.g., between specific values or ranges of values, which may be identified in terms of an upper and/or lower range boundary) and a code ID. In some embodiments, the mapping may be maintained in a flat-file database, hash table, or other suitable data structure in a memory (e.g., in local memory 119).

At operation 328, the processing logic may configure the LDPC encoder based on the code ID determined at operation 326. In some embodiments, for example, the processing logic may provide the code ID to the LDPC encoder as part of an encoding instruction, and the LDPC encoder may retrieve or access the corresponding LDPC matrix (i.e., corresponding to the code ID) from the memory when encoding the host data. In some embodiments, the processing logic may determine a code ID and configure the LDPC encoder (e.g., by performing operations 322-328) for each host data storage request, for each host data sequence in a host data storage request, and/or periodically (e.g., at specified time intervals of time, or as a data cursor location changes).

At operation 330, the processing logic may store the encoded data generated by the LDPC encoder to a memory device. In at least one embodiment, for example, the processing logic may write the encoded data to memory cells of a memory device, such as memory device 130 (e.g., to an identified storage location therein). In some embodiments, the processing logic may write the encoded data generated by the LDPC encoder as the encoded data is generated (e.g., as each encoded codeword is generated). In some embodiments, the processing logic may write the encoded data to the memory device after all host data in a host data storage request has been encoded.

In at least one embodiment, the processing logic may also store or record the LDPC code or LDPC codes used to generate the encoded data in association with the stored encoded data. In some embodiments, for instance, the processing logic may record the LDPC matrix used to generate each codeword of encoded data in association with a location at which the encoded code is written to a memory device. In at least one embodiment, for example, the processing logic may record a code ID associated with each LDPC matrix used to generate the encoded data that was stored in association with a location thereof. In some embodiments, for instance, the processing logic may record such information as part of an FTL mapping table. In some embodiments, for example, the processing logic may store a code ID of an LDPC matrix used to encode a TU as part of the metadata associated with each TU in the mapping table.

Figure 4:
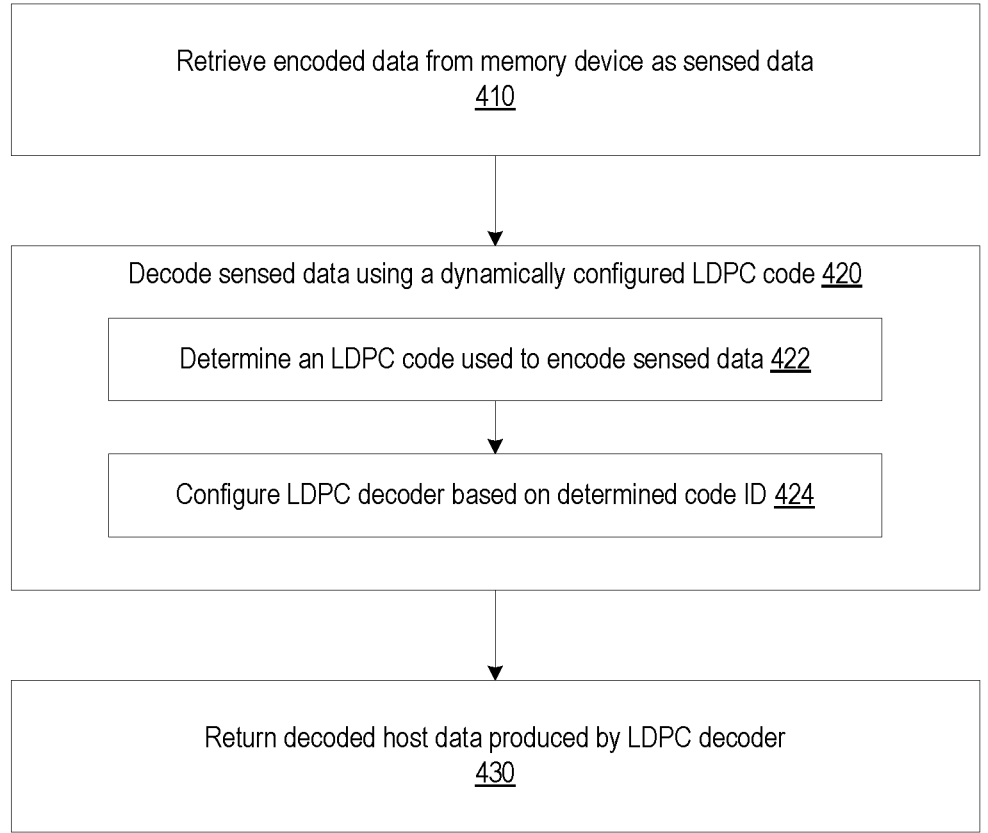
FIG. 4 is a high-level flow diagram of an example method for decoding data using a dynamically configurable LDPC code in accordance with some embodiments

FIG. 4 is a high-level flow diagram of an example method 400 of decoding data using a dynamically configured LDPC code, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory sub-system 110 using error correction coding component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic may retrieve encoded data from a memory device as sensed data. In at least one embodiment, for example, the processing logic may receive a request from a host system (e.g., host system 120) to retrieve host data that was previously encoded and stored at memory sub-system 110 (e.g., in response to an earlier storage request). In response to the request, the processing logic may determine where encoded data corresponding to the requested host data is stored (e.g., using an FTL mapping table) and may perform a read operation to read the encoded data back from a memory device. In at least one embodiment, for example, the processing logic may read encoded data back from a memory device as part of a read operation by performing one or more sense operations to determine a value of the memory cells that store the encoded data. The encoded data read back from the memory device (or sensed data) may comprise one or more sensed codewords. It will be appreciated that, in some cases, the sensed data read back from the memory device may differ from the initial encoded data that was first generated, for example, on account of errors (e.g., bit-flip errors) that may have occurred during storage and/or retrieval of the encoded data to/from the memory device. The sensed data, however, may be encoded using an ECC, such as an LDPC code, which may allow the processing logic to detect and correct errors in the sensed data and obtain initial host data encoded therein.

At operation 420, the processing logic may attempt to decode the sensed data using a dynamically configured LDPC code and obtain host data encoded therein. In at least one embodiment, for example, the processing logic may provide an LDPC decoder with a sequence of one or more symbols of sensed data (e.g., a sensed codeword) and instruct the LDPC decoder to process the sensed data and obtain one or more sequences of host data encoded therein. In processing the sensed data, the LDPC decoder may detect and attempt to correct any errors therein.

In at least one embodiment, the sensed data (e.g., a sensed codeword) may have been encoded using a dynamically configured LDPC code and the processing logic may dynamically configure the LDPC code used by the LDPC decoder to decode the sensed data. In some embodiments, for example, the sensed data may have been encoded using one or more LDPC matrices that were dynamically selected from a collection of LDPC matrices stored in memory (e.g., local memory 119). When attempting to decode the sensed data, the processing logic may dynamically select the same LDPC matrix from the collection of LDPC matrices in memory for use by the LDPC decoder.

By way of example, in some embodiments, at operation 422, the processing logic may determine an LDPC code used to encode the sensed data (e.g., an LDPC code used to encode a sensed codeword). In some embodiments, for example, the identity of the LDPC matrices (e.g., unique code IDs associated therewith) used to encode the sensed data may have been recorded in association with the stored encoded data (e.g., in association with a location at which the encoded code was written to a memory device). In some embodiments, for instance, the identity of the LDPC matrices (e.g., associated code IDs) may have been recorded in an FTL mapping table. In some embodiments, for example, the metadata associated with each TU in the mapping table may contain a code ID of the LDPC matrix used to encode the data stored at a location associated with the TU. Accordingly, in some embodiments, the processing logic may determine the LDPC matrices used to encode the sensed data from the FTL mapping table (e.g., by accessing the metadata of one or more corresponding TUs).

At operation 424, the processing logic may configure the LDPC decoder based on the LDPC code (e.g., code ID of a corresponding LDPC matrix) determined at operation 422. In some embodiments, for example, the processing logic may provide the code ID to the LDPC encoder as part of a decoding instruction. Based on the provided code ID, the LDPC encoder may retrieve or access a corresponding LDPC matrix, from the collection of LDPC matrices in memory, when decoding the sensed data.

At operation 430, the processing logic may return the decoded host data produced by the LDPC decoder. In some embodiments, for example, the processing logic may return the decoded host data to the host system from which the host data retrieval request was received. In at least one embodiment, for example, the processing logic may return the decoded host data to the host system as it is obtained by the LDPC decoder (e.g., as each sensed codeword is decoded). In some embodiments, the processing logic may return the decoded host data to the host system after all sensed data has been decoded.

Figure 5:
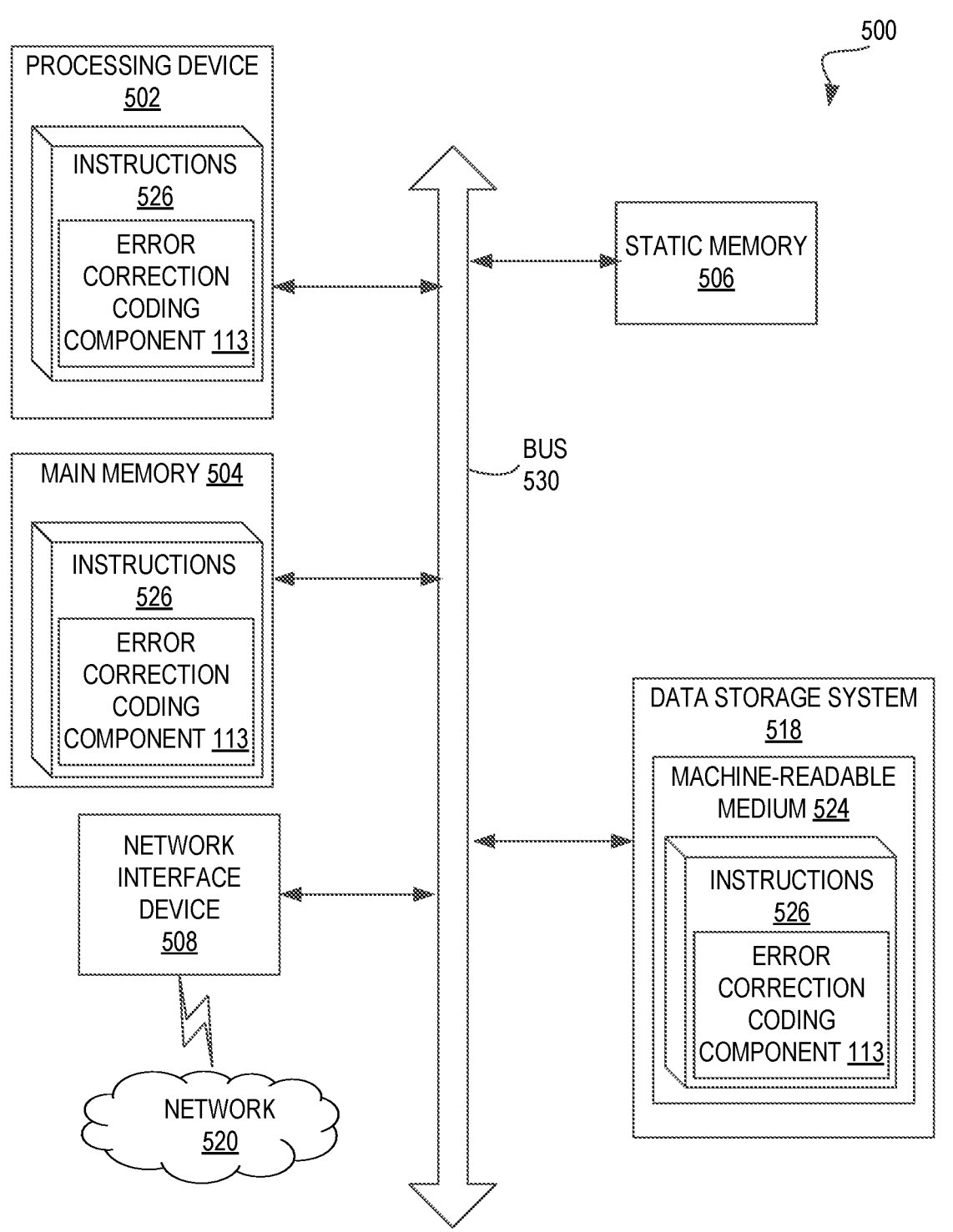
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error correction coding component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an error correction coding component (e.g., the error correction coding component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium"

shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
receiving input data for storage by the system;
encoding the input data using a low-density parity-check (LDPC) matrix to generate encoded data, wherein the LDPC matrix is selected from a plurality of LDPC matrices, each of the plurality of LDPC matrices having a common size and a unique degree distribution, wherein the degree distribution indicates at least one of a number of columns an LDPC matrix or a number of rows in the LDPC matrix having a particular weight; and
storing the encoded data on the memory device.

2. The system of claim 1, wherein the processing device is to perform operations comprising:
determining one or more use case parameters;
determining one or more physical device parameters; and
selecting the LDPC matrix from the plurality of LDPC matrices based on the one or more use case parameters and one or more physical device parameters.

3. The system of claim 2, wherein the one or more use case parameters comprise one or more of a desired code rate, a number of program-erase (PE) cycles, or an operating temperature.

4. The system of claim 2, wherein the one or more physical device parameters comprise one or more of a wordline identifier, a block identifier, a page type, a die lot number, a die wafer number, or an intra-wafer die location.

5. The system of claim 2, wherein determining the one or more physical devices parameters comprises operations further comprising:
determining an intended location on the memory device where the encoded data is to be stored; and
determining the one or more physical device parameters associated with the intended location.

6. The system of claim 2, wherein the processing device is to perform operations further comprising:
configuring an LDPC encoder to use the LDPC matrix to encode the input data.

7. The system of claim 2, wherein the LDPC matrix is selected from the plurality of LDPC matrices based on its corresponding degree distribution.

8. The system of claim 7, wherein the corresponding degree distribution of the LDPC matrix is selected to provide improved performance with respect to trigger rate or reliability for certain usage conditions.

9. A method comprising:
receiving input data for storage by a system;
encoding the input data using a low-density parity-check (LDPC) matrix to generate encoded data, wherein the LDPC matrix is selected from a plurality of LDPC matrices, each of the plurality of LDPC matrices having a common size and a unique degree distribution, wherein the degree distribution indicates at least one of a number of columns an LDPC matrix or a number of rows in the LDPC matrix having a particular weight; and storing the encoded data on a memory device of the system.

10. The method of claim 9 comprising:

determining one or more use case parameters;

determining one or more physical device parameters; and selecting the LDPC matrix from the plurality of LDPC matrices based on the one or more use case parameters and one or more physical device parameters.

11. The method of claim 10, wherein the one or more use case parameters comprise one or more of a desired code rate, a number of program-erase (PE) cycles, or an operating temperature.

12. The method of claim 10, wherein the one or more physical device parameters comprise one or more of a wordline identifier, a block identifier, a page type, a die lot number, a die wafer number, or an intra-wafer die location.

13. The method of claim 10, wherein determining the one or more physical devices parameters comprises:

determining an intended location on the memory device where the encoded data is to be stored; and determining the one or more physical device parameters associated with the intended location.

14. The method of claim 10 comprising:

configuring an LDPC encoder to use the LDPC matrix to encode the input data.

15. The method of claim 14, wherein the LDPC matrix is selected from the plurality of LDPC matrices based on its corresponding degree distribution.

16. The method of claim 15 wherein the corresponding degree distribution of the LDPC matrix is selected to provide improved performance with respect to trigger rate or reliability for certain usage conditions.

* * * * *